UNITED STATES PATENT OFFICE.

WILLIAM A. KÖNEMAN, OF CHICAGO, ILLINOIS.

PROCESS OF RECOVERING RUBBER FROM RUBBER-WASTE.

No. 834,623.     Specification of Letters Patent.     Patented Oct. 30, 1906.

Application filed March 28, 1906. Serial No. 308,418.

*To all whom it may concern:*

Be it known that I, WILLIAM A. KÖNEMAN, a citizen of the United States, residing at Chicago, in the county of Cook and State of Illinois, have invented a new and useful Improvement in the Process of Recovering Rubber from Rubber-Waste, of which the following is a specification.

In connection with the practice of my process of recovering rubber from rubber-waste, which forms the subject of my allowed application for Letters Patent, Serial No. 282,019, filed October 9, 1905, I have discovered a treatment of the rubber which greatly improves its quality, as hereinafter described.

My aforesaid process involves, broadly stated, boiling the finely-divided material in a mineral-acid solution with the addition of a halogen salt of the alkaline group, such as sodium or calcium chlorid, without setting free in a gaseous state the chlorin, bromin, or iodin, chlorid of sodium being the salt preferably employed. After removing the acid and dissolved matter from the rubber it is boiled in a solution of alkaline salt and washed and dried.

While the present improvement has been developed, as stated, in connection with the aforesaid salted-acid process, it is not my intention to limit its use to that particular connection, inasmuch as it is found to produce the same advantages, even though in a minor degree, when used with any process involving the subjection of the material to the action of an acid or an alkaline solution.

The recovery of rubber as practiced by the more or less successful processes generally known in the art may be stated to consist in the treatment of the finely-divided rubber-scrap either in an acid or an alkaline solution, or in both of such solutions in succession, at various temperatures and under various pressures. The rubber thus recovered is in a more or less resinified condition and is lacking in the desirable qualities of virgin rubber which determine the value of the latter—namely, those of tensile strength and elasticity and the characteristic commonly known as "fiber." It is this fiber condition in rubber, which must show itself in tearing, that largely determines the amount of wear and tear which articles made from it will stand. By my aforesaid previous process I have aimed more particularly at obtaining in a high degree the qualities in the recovered product of elasticity or resiliency and tensile strength. By my present improvement the tensile strength of the product is materially increased and there is imparted to it a fiber quality, of the character of interlaced atoms, which renders the rubber resistant to tearing action, and consequently increases the durability and utility of articles manufactured from it.

The derogatory effect of the acid reaction in the usual acid treatment employed for recovering rubber from rubber-waste and that of the alkaline reaction in the usual alkaline tratment for the same purpose are found to be due to depriving the rubber of those resinous and oleaginous constituents which in the virgin gum cause proper cohesion of the caoutchouc atoms. The object of my present improvement is to prevent such deleterious chemical reaction without impairing the solvent action of the solution employed on the uncombined sulfur, vegetable fiber, certain mineral compounds, &c., contained in the material treated, and I have discovered that such deleterious action is prevented, without interference with the solvent action of the solution employed, by bringing into contact with the finely-divided rubber a reducing agent in the form of a mixable hydrocarbon, preferably in the form of either coal-tar or vegetable tar, in such proportion as will produce the desired result.

My invention therefore consists, broadly, in adding to the rubber-waste, either while it is in the acid or the alkali solution or before introducing it into the solution, a suitable proportion of a suitably-adherent hydrocarbon.

I find that according as the rubber of the waste material under treatment is more or less pure the quantity of the tar required is greater or less. Thus when the material treated in the solution is scrap from automobile, bicycle, or solid vehicle tires it is desirable to use the tar in the proportion of from three to five per cent. of the material, while with inferior scrap, as that from rubber hose and belting, about two per cent. of the tar is sufficient, and for boot and shoe scrap about one and one-half to two and one-half per cent. of the tar is a suitable proportion. Where the acid process is employed, the tar may be added to the acid solution, though then the latter should be subjected to agitation while boiling and acting on the rubber-waste material undergoing treatment; but unless agitation is practiced the tar should be thoroughly mixed with the scrap preparatory to subjecting the latter to the treatment in the solution. Where the alkaline process is employed, an adherent hydrocarbon, such as tar or a vegetable balsam, is to be mixed with the scrap before subjecting the latter to the action of the solution, and no hydrocarbon may be used in this case which will saponify under the action of the alkali.

The product resulting from the acid or the alkaline treatment will show the desired fiber character if the proper proportion of tar is used. Although the fiber-producing result of my improvement is obtainable with the usual processes involving treatment of the material in the acid and alkaline solutions referred to, by such treatment the fiber will be weak in proportion to the degree of resinification of the caoutchouc resulting therefrom, whereas when employed in connection with my aforesaid salted-acid treatment of the rubber, whereby resinification of the caoutchouc is avoided, the beneficial result of the use of the reducing agent is obtained in the maximum degree.

It is essential that the hydrocarbon employed shall be of a nature to attach itself to the rubber particles and permeate the rubber during the boiling period. I find the best materials for the purpose to be, in the order named, as follows: coal-tar, coal-tar pitch thinned in oil, vegetable tar, melted or thinned vegetable pitch, vegetable balsams, dissolved rosin, and invert-sugar. Whichever agent is employed is dependent upon the character of stock, fiber, and softness of resultant stock desired. As the greater percentage of the hydrocarbon employed finally remains with the solution, it is desirable to save the solution for successive use, in which case a lesser amount of the hydrocarbon may be added to the next charge. Tar will rise to the surface of an acid solution, while it sinks in an alkaline solution, which makes it desirable in either treatment to work the stock in as thick or slushy condition as possible to assure intimate contact. Too thin a condition of solution will prevent proper results with any one of the hydrocarbons mentioned, as in that case their action is not sufficiently powerful, owing to lack of contact and too great dilution, to assure full benefits unless used in such quantity as to seriously interfere with the regular solvent and devulcanizing action of the solution employed. After the proper action on the rubber has taken place the stock may be thinned down and washed to any extent desired, either with hot or cold water, and should be washed and cleansed thoroughly before drying, when the result is that the material will be free from the odor of the hydrocarbon employed and will show a degree of strength and amount of fiber structure which is now found only in high-grade virgin-rubber compounds.

Even ground rubber, practically free from cotton or wool fiber, may be treated with the hydrocarbon in boiling water or in a weak acid or alkaline solution, and upon such treated stock being mixed with other stock it will impart a considerable amount of fiber to the mixed mass. Likewise low-grade virgin rubber may be greatly improved by such treatment, and I do not, therefore, limit my invention to the use of the hydrocarbon treatment for the purpose of treating devulcanized rubber-scrap only.

My invention is distinguished from processes known to me of recovering rubber from rubber waste by boiling the finely-divided waste material in an acid or an alkaline solution and treating the recovered rubber with volatile hydrocarbons, commonly known as "rubber solvents," such as the light mineral and vegetable oils and extracts, the same including benzin, naphtha, turpentine, bicarburet of sulfur, chloroform, and the like. None of these are either mixable with or soluble in an aqueous acid or alkaline solution, and when used, if not under confinement, they are expelled by boiling the solution. Moreover, they have no fiber-producing effect on the rubber, which is an all-important result of my invention. I therefore disclaim such use of these volatile hydrocarbons. The hydrocarbon required for my purpose must possess as an essential quality that of being mixable with or solvent in, or both mixable with and solvent in, the aqueous acid or alkaline solution in which the material is boiled, tar, for example, being in part mixable and in part soluble in the acid solution, while resin is entirely soluble in an alkaline solution.

What I claim as new, and desire to secure by Letters Patent, is—

1. The process of treating finely-divided rubber, which consists in boiling the same in a suitable liquid and adding thereto a mixable fixed hydrocarbon such as tar, pitch, resin or balsam, for the purpose set forth.

2. As a step in the recovery of rubber from rubber-waste material by treating the material in a suitable aqueous chemical solution, adding to said material a suitable proportion of hydrocarbon of the character described, for the purpose set forth.

3. As a step in the recovery of rubber from rubber-waste material by treating the material in a suitable aqueous chemical solution, adding to said material a suitable proportion of tar, pitch or balsam, for the purpose set forth.

4. The process of recovering rubber from rubber-waste material, which consists in boiling the finely-divided material with the addition thereto of a suitable proportion of hydrocarbon of the character described in a suitable aqueous chemical solution, and removing the dissolved and decomposed fiber, for the purpose set forth.

5. The process of recovering rubber from rubber-waste material, which consists in boiling the finely-divided material with the addition thereto of a suitable proportion of mixable hydrocarbon in a mineral-acid solution containing a halogen salt of the alkaline group, such as sodium or calcium chlorid, and removing the dissolved and decomposed fiber, for the purpose set forth.

6. The process of recovering rubber from rubber-waste material, which consists in boiling the finely-divided material with the addition thereto of a suitable proportion of mixable hydrocarbon in a mineral-acid solution containing a halogen salt of the alkaline group, removing the acid and dissolved matter from the rubber, then boiling the rubber in a solution of alkaline salt, and washing and drying the product, for the purpose set forth.

7. The process of treating finely-divided rubber which consists in boiling the same in an acid solution and adding thereto a mixable fixed hydrocarbon, such as tar, pitch, resin or balsam, for the purpose set forth.

8. The process of treating finely-divided rubber which consists in boiling the same in a salted-acid solution and adding thereto a mixable fixed hydrocarbon, such as tar, pitch, resin or balsam, for the purpose set forth.

WILLIAM A. KÖNEMAN.

In presence of—
  J. H. LANDES,
  L. HEISLAR.